US011987005B2

(12) United States Patent
Zeulner et al.

(10) Patent No.: US 11,987,005 B2
(45) Date of Patent: May 21, 2024

(54) BUILD PLANE MEASUREMENT SYSTEMS AND RELATED METHODS

(71) Applicants: Concept Laser GmbH, Lichtenfels (DE); General Electric Company, Schenectady, NY (US)

(72) Inventors: Fabian Zeulner, Lichtenfels (DE); Rachel Wyn Levine, West Chester, OH (US); Mackenzie Ryan Redding, Mason, OH (US)

(73) Assignees: Concept Laser GmbH, Lichtenfels (DE); General Electric Company, Schenectady, NY (US)

( * ) Notice: Subject to any disclaimer, the term of this patent is extended or adjusted under 35 U.S.C. 154(b) by 186 days.

(21) Appl. No.: 17/098,625

(22) Filed: Nov. 16, 2020

(65) Prior Publication Data

US 2021/0187861 A1 Jun. 24, 2021

Related U.S. Application Data

(60) Provisional application No. 62/950,636, filed on Dec. 19, 2019.

(51) Int. Cl.
*B29C 64/393* (2017.01)
*B29C 64/153* (2017.01)
(Continued)

(52) U.S. Cl.
CPC .......... *B29C 64/393* (2017.08); *B29C 64/153* (2017.08); *B29C 64/245* (2017.08);
(Continued)

(58) Field of Classification Search
CPC ... B29C 64/153; B29C 64/245; B29C 64/393; B33Y 10/00; B33Y 30/00; B33Y 50/00; B33Y 50/02
See application file for complete search history.

(56) References Cited

U.S. PATENT DOCUMENTS

| 6,046,426 A | 4/2000 | Jeantette et al. |
| 6,205,243 B1 | 3/2001 | Migdal et al. |
| (Continued) | | |

FOREIGN PATENT DOCUMENTS

CN 109128824 A 1/2019

OTHER PUBLICATIONS

European Search Report for EP 20 21 3196, Apr. 2021.*
(Continued)

*Primary Examiner* — Ryan M Ochylski
(74) *Attorney, Agent, or Firm* — Dority & Manning, P.A.

(57) ABSTRACT

An additive manufacturing machine includes an energy beam system situated in a fixed position relative to a reference plane coinciding with an expected location of a build plane, an energy beam system with an irradiation device configured to generate an energy beam and to direct the energy beam upon the build plane, and a position measurement system configured to determine a position of the build plane. A position measurement assembly includes one or more position sensors, and one or more mounting brackets configured to attach the one or more position sensors to an energy beam system of an additive manufacturing machine. The position measurement assembly is configured to determine a position of a build plane with the energy beam system situated in a fixed position relative to a reference plane coinciding with an expected location of the build plane.

12 Claims, 11 Drawing Sheets

(51) Int. Cl.
  *B29C 64/245* (2017.01)
  *B33Y 10/00* (2015.01)
  *B33Y 30/00* (2015.01)
  *B33Y 50/02* (2015.01)

(52) U.S. Cl.
  CPC .............. *B33Y 10/00* (2014.12); *B33Y 30/00* (2014.12); *B33Y 50/02* (2014.12)

(56) References Cited

U.S. PATENT DOCUMENTS

| | | |
|---|---|---|
| 6,492,651 B2 | 12/2002 | Kerekes |
| 7,625,198 B2 | 12/2009 | Lipson et al. |
| 8,243,289 B2 | 8/2012 | Lin et al. |
| 8,395,785 B2 | 3/2013 | Keshavmurthy et al. |
| 8,598,523 B2 | 12/2013 | Stecker et al. |
| 10,456,984 B2 | 10/2019 | Matusik et al. |
| 2018/0345582 A1 | 12/2018 | Schade |
| 2018/0348492 A1 | 12/2018 | Pavlov et al. |
| 2019/0047048 A1 | 2/2019 | Riemann |
| 2019/0070663 A1 | 3/2019 | Corsmeier |
| 2019/0275734 A1 | 9/2019 | Zeulner |
| 2019/0314930 A1 | 10/2019 | Winiarski et al. |
| 2020/0369918 A1 | 11/2020 | Kondo et al. |

OTHER PUBLICATIONS

T. M Haffkamp et al., "A trade-off analysis of recoating methods for vat photopolymerization of ceramics". Jan. 1, 2017, p. 697-699.

\* cited by examiner

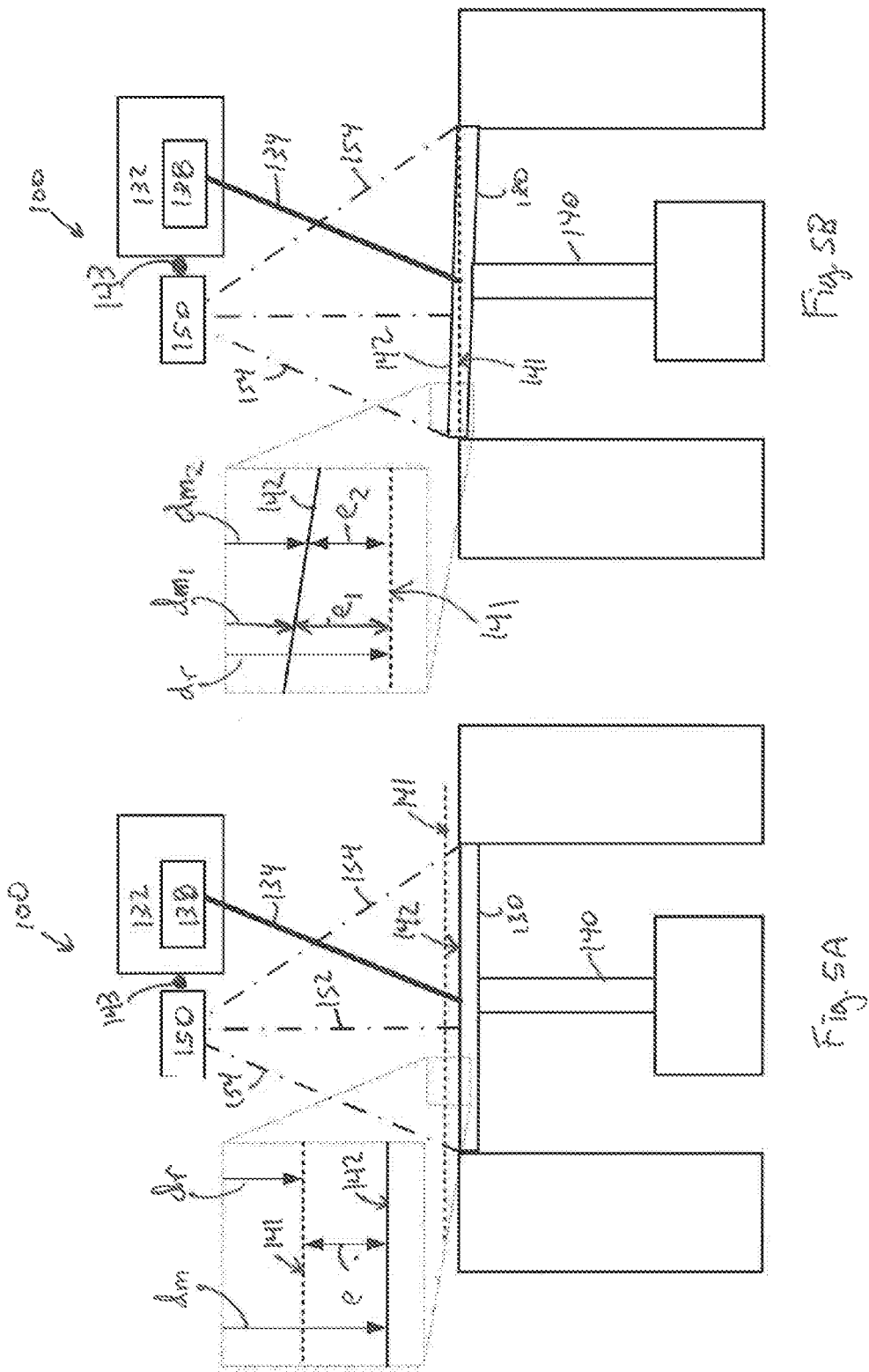

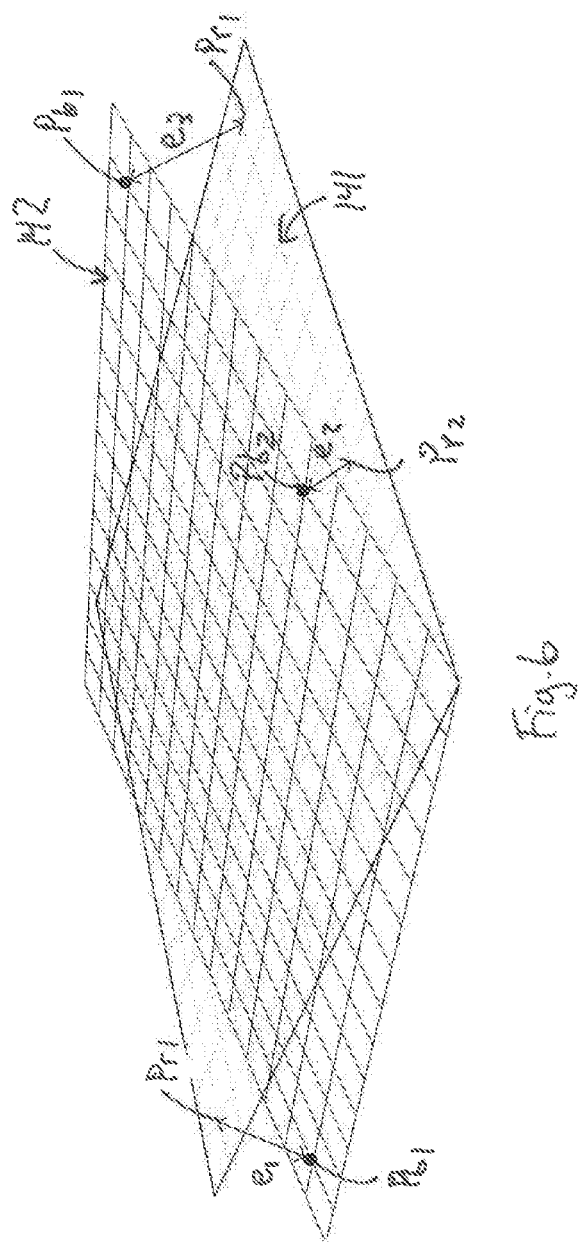

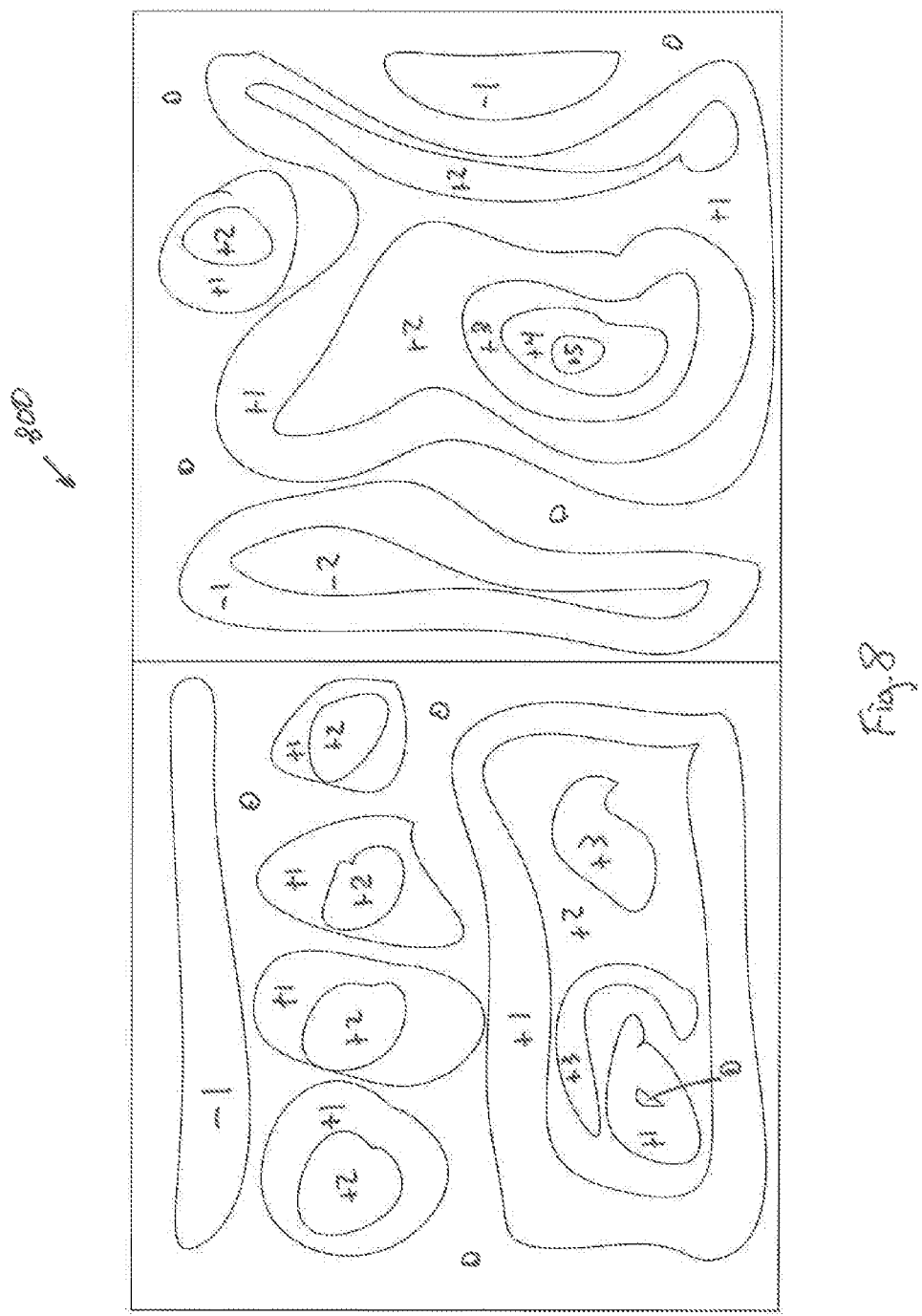

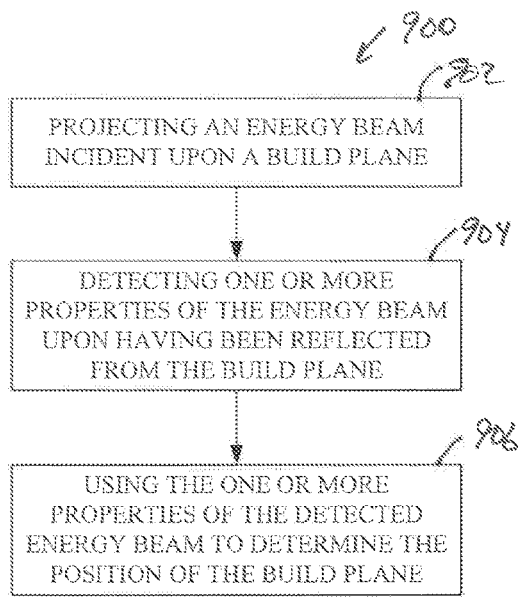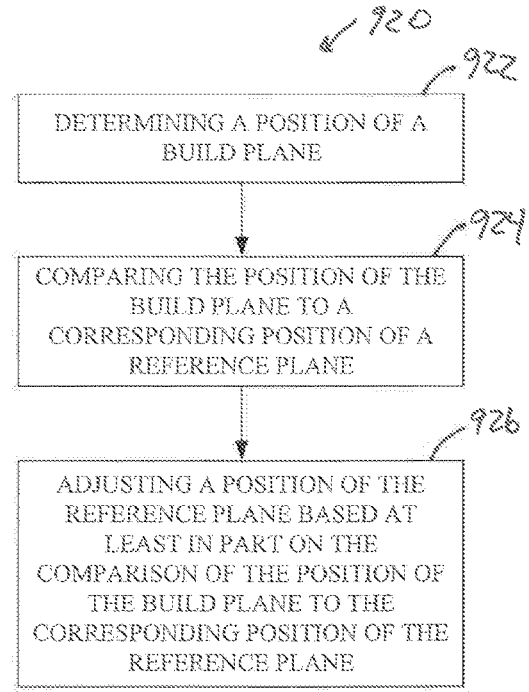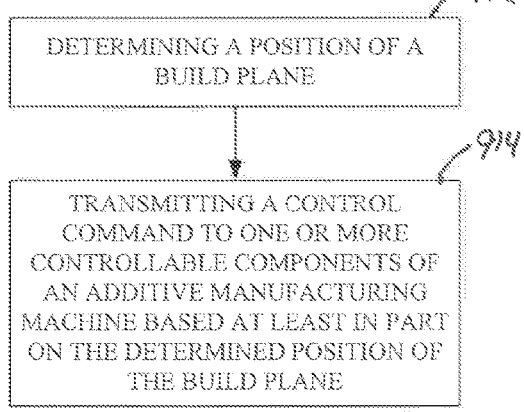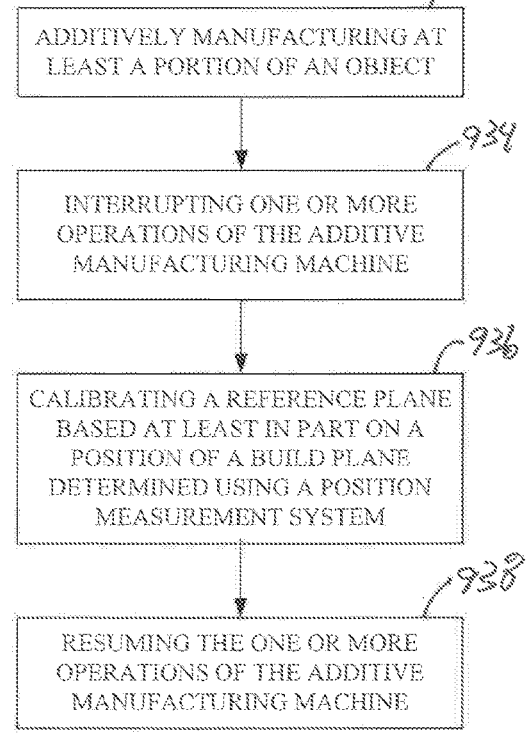

BUILD PLANE MEASUREMENT SYSTEMS AND RELATED METHODS

PRIORITY INFORMATION

The present application claims priority to U.S. Provisional Patent Application Ser. No. 62/950,636 filed on Dec. 19, 2019, which is incorporated by reference herein for all purposes.

FIELD

The present disclosure generally pertains to systems and assemblies for determining a position of a build plane in an additive manufacturing machine, including systems and assemblies for measuring a distance between an energy beam generating device and a build plane.

BACKGROUND

An additive manufacturing machine may include one or more energy beam generating devices uses to irradiate sequential layers of powder material defining a powder bed distributed across a build plane. The position of an energy beam generating device relative to the build plane affects properties of the energy beam incident upon the powder material defining the powder bed. An energy beam generating device may be configured with a reference position that defines the position of the energy beam generating device relative to the build plane. However, deviations from the reference position may cause a corresponding undesirable deviations in one or more properties of the energy beam incident upon the powder bed. Such variability may affect the quality of components produced using the additive manufacturing machine. Accordingly, there exists a need for improved additive manufacturing machines and related systems and methods that address actual or potential deviations from a reference position for an energy beam generating device relative to a build plane and/or a powder bed.

BRIEF DESCRIPTION

Aspects and advantages will be set forth in part in the following description, or may be obvious from the description, or may be learned through practicing the presently disclosed subject matter.

In one aspect, the present disclosure embraces additive manufacturing machines. An exemplary additive manufacturing machine may include an energy beam system situated in a fixed position relative to a reference plane coinciding with an expected location of a build plane, an energy beam system with an irradiation device configured to generate an energy beam and to direct the energy beam upon the build plane, and a position measurement system configured to determine a position of the build plane.

In another aspect, the present disclosure embraces position measurement assemblies for use with an additive manufacturing machine. An exemplary position measurement assembly may include one or more position sensors, and one or more mounting brackets configured to attach the one or more position sensors to an energy beam system of an additive manufacturing machine. The position measurement assembly may be configured to determine a position of a build plane with the energy beam system situated in a fixed position relative to a reference plane coinciding with an expected location of the build plane.

In yet another aspect, the present disclosure embraces methods of determining a position of a build plane of an additive manufacturing machine. An exemplary method may include projecting an energy beam incident upon a build plane, detecting one or more properties of the energy beam upon having been reflected from the build plane, and using the one or more properties of the detected energy beam to determine the position of the build plane.

In yet another aspect, the present disclosure embraces methods of aligning a reference plane to a build plane of an additive manufacturing machine, and/or methods of calibrating a position of a reference plane of an additive manufacturing machine. An exemplary method may include determining a position of a build plane of an additive manufacturing machine, comparing the position of the build plane to a corresponding position of a reference plane, and adjusting a position of the reference plane based at least in part on the comparison of the position of the build plane to the corresponding position of the reference plane.

In yet another aspect, the present disclosure embraces methods of operating an additive manufacturing machine and/or methods of additively manufacturing an object. In some embodiments, an exemplary method may include determining a position of a build plane of an additive manufacturing machine, and transmitting a control command to one or more controllable components of an additive manufacturing machine based at least in part on the determined position of the build plane. Additionally, or in the alternative, an exemplary method may include additively manufacturing at least a portion of an object, interrupting one or more operations of the additive manufacturing machine, calibrating a reference plane based at least in part on a position of a build plane determined using a position measurement system, and resuming the one or more operations of the additive manufacturing machine.

In yet another aspect, the present disclosure embraces additive manufacturing systems. An exemplary system may include an additive manufacturing machine, one or more build modules configured to be installed into and removed from the additive manufacturing machine, one or more powder modules configured to be installed into and removed from the additive manufacturing machine; and a control system. In some embodiments, an exemplary additive manufacturing machine may include an energy beam system situated in a fixed position relative to a reference plane coinciding with an expected location of a build plane, an energy beam system comprising an irradiation device configured to generate an energy beam and to direct the energy beam upon the build plane, and a position measurement system configured to determine a position of the build plane. The control system may be configured to cause the position measurement system to determine the position of the build plane.

In yet another aspect, the present disclosure embraces computer-readable medium comprising computer-executable instructions, which when executed by a processor associated with an additive manufacturing system, causes the additive manufacturing system to perform operations in accordance with the present disclosure. Exemplary operations may include determining a position of a build plane of an additive manufacturing machine, aligning a reference plane to a build plane of an additive manufacturing machine, calibrating a position of a reference plane of an additive manufacturing machine, operating an additive manufacturing machine, and/or additively manufacturing an object.

These and other features, aspects and advantages will become better understood with reference to the following description and appended claims. The accompanying drawings, which are incorporated in and constitute a part of this specification, illustrate exemplary embodiments and, together with the description, serve to explain certain principles of the presently disclosed subject matter.

BRIEF DESCRIPTION OF THE DRAWINGS

A full and enabling disclosure, including the best mode thereof, directed to one of ordinary skill in the art, is set forth in the specification, which makes reference to the appended Figures, in which:

FIGS. 5A and 5B schematically depict an exemplary position measurement systems determining a position of a build plane;

FIG. 6 schematically depicts an exemplary comparison of a build plane to a reference plane;

FIG. 8 schematically depicts an exemplary depth map of a surface of a build plane;

FIGS. 9A-9D show flowcharts depicting exemplary methods in accordance with the present disclosure.

Figure 1:
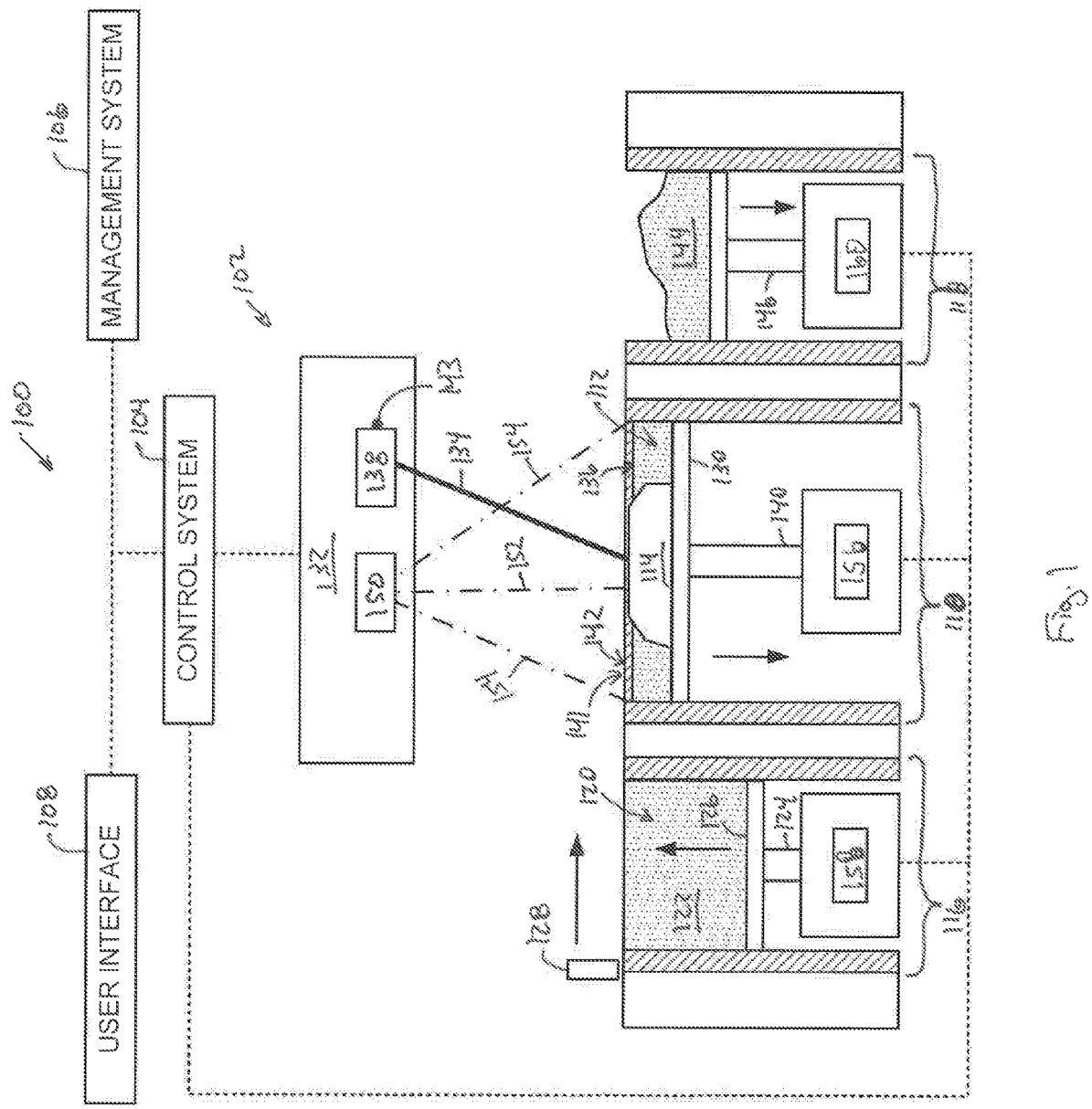
FIG. 1 schematically depicts an exemplary additive manufacturing system.

Repeat use of reference characters in the present specification and drawings is intended to represent the same or analogous features or elements of the present disclosure.

DETAILED DESCRIPTION

Reference now will be made in detail to exemplary embodiments of the presently disclosed subject matter, one or more examples of which are illustrated in the drawings. Each example is provided by way of explanation and should not be interpreted as limiting the present disclosure. In fact, it will be apparent to those skilled in the art that various modifications and variations can be made in the present disclosure without departing from the scope of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

It is understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Here and throughout the specification and claims, range limitations are combined and interchanged, and such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems.

The present disclosure provides additive manufacturing machines and related systems and methods, as well as systems and assemblies for determining a position of a build plane in an additive manufacturing machine. The position of the build plane may be compared to a corresponding position of a reference plane, for example, to determine a divergence between the build plane and the reference plane. The position of the reference plane may be adjusted based at least in part on the comparison of the position of the build plane to the corresponding position of the reference plane.

In some embodiments, an adjustment to a position of a reference plane may be performed, for example, in connection with a calibration procedure, such as to align the build plane with the reference plane. Such a calibration procedure may be performed at any time, including before, during, and/or after operating the additive manufacturing machine. In some embodiments, a calibration procedure may be performed when additive manufacturing operation has been interrupted, such as prior to resuming operations. For example, with large format additive manufacturing machines, in some instances additive manufacturing operations may be interrupted to make operational changes, such as replenishing a supply of powder material and/or exchanging build modules, powder modules, and/or overflow modules, and so forth. The calibration may mitigate a divergence of a build plane from a reference plane, thereby improving precision and accuracy of the additive manufacturing and the resulting quality of objects manufactured using the additive manufacturing machine.

As used herein, the term "build plane" refers to a plane defined by a surface upon which an energy beam impinges during an additive manufacturing process. Generally, the surface of a powder bed defines the build plane; however, prior to distributing powder material across a build module, a build plate that supports the powder bed generally defines the build plane. When performing an additive repair process on a previously fabricated object, the build plane refers to a plane defined by a surface of the previously fabricated object upon which the energy beam impinges during the additive repair process.

As used herein, the term "reference plane" refers to a plane that defines an expected position of a build plane. A reference plane may be defined, for example, according to a calibration, which may be performed periodically and updated from time to time. The reference plane may be utilized by an additive manufacturing machine to direct an energy beam onto a build plane to melt or fuse a layer of powered material corresponding to the build plane.

In some embodiments, a "scan field calibration" may be performed using a position of the build plane determined in accordance with the present disclosure and/or using a position of a reference plane that has been adjusted based at least in part on a determined position of a build plane. The scan field calibration may be performed to ensure that the energy beam system provides an energy beam that is properly focused across the working surface of the build plane. Scan field calibrations may be performed at any time, including before, during, and/or after sequential layers of powder material have been distributed across the build module and/or before, during, and/or after the sequential layers of powder have been selectively irradiated by an energy beam to form the respective layer of the object. Scan field accuracy may be improved with respect to the operation of a particular energy beam generating device, and/or with respect to relative operations of cooperative energy beam devices such as those used to perform overlapping contour paths (e.g., multi-beam stitching).

In some embodiments, the presently disclosed subject matter may be employed to mitigate erroneous calibrations, unintended movements of various componentry of the additive manufacturing machine such as movements of the build platform. Additionally, recoater wear or damage can be mitigated that may otherwise impact the position of the build plane relative to the reference plane.

In some embodiments, the presently disclosed subject matter may be employed to determine a movement of an object being additively manufactured, to determine a probability of a recoater contacting an object or a portion thereof, and/or to determine a location of an object in connection with an additive repair process and/or a machine restart.

As described herein, exemplary embodiments of the present subject matter involve the use of additive manufacturing machines or methods. As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components.

An exemplary additive manufacturing machine may be configured to utilize any desired additive manufacturing technique. In an exemplary embodiment, the additive manufacturing machine 102 may perform a powder bed fusion (PBF) process, such as a direct metal laser melting (DMLM) process, an electron beam melting (EBM) process, an electron beam sintering (EBS) process, a selective laser melting (SLM) process, a directed metal laser sintering (DMLS) process, or a selective laser sintering (SLS) process. In an exemplary PBF process, the additive manufacturing machine builds components in a layer-by-layer manner by melting or fusing sequential layers of a powder material to one another.

Additive manufacturing technology may generally be described as enabling fabrication of complex objects by building objects point-by-point, layer-by-layer, typically in a vertical direction; however, other methods of fabrication are contemplated and within the scope of the present disclosure. For example, although the discussion herein refers to the addition of material to form successive layers, the presently disclosed subject matter may be practiced with any additive manufacturing technique or other manufacturing technology, including layer-additive processes, layer-subtractive processes, or hybrid processes.

The additive manufacturing processes described herein may be used for forming components using any suitable material. For example, the material may be metal, concrete, ceramic, polymer, epoxy, photopolymer resin, plastic, or any other suitable material that may be in solid, liquid, powder, sheet material, wire, or any other suitable form.

Each successive layer may be, for example, between about 10 μm and 200 μm, although the thickness may be selected based on any number of parameters and may be any suitable size according to alternative embodiments. In exemplary embodiments, the position of a reference plane and/or other operational parameters of an additive manufacturing machine may be adjusted based at least in part on a position of a build plane having been determined in accordance with the present disclosure.

Such adjustments to the position of the reference plane may made in any one or more directions of a cartesian coordinate system. In an exemplary embodiment a position of a reference plane may be adjusted vertically (e.g., along a z-axis); however, lateral (x-axis) and horizontal (y-axis) adjustments are also contemplated. Additionally, or in the alternative, adjustments to one or more operating parameters of the additive manufacturing machine may effectively equate to an adjustment to the position of the reference plane. With reference to the position of a reference plane-point, such adjustments may actually or effectively move the reference plane-point a distance of from about 1 micrometers (μm) and about 2 millimeters (mm), such as from about 1 μm and 1 mm, such as from about 1 μm and 10 μm, such as from about 2 μm and 10 μm, such as from about 5 μm and 50 μm, such as from about 10 μm and 1 mm, such as from about 10 μm and 500 μm, or such as from about 25 μm and 250 μm.

A reference plane-point may be adjusted by relatively small increments or relatively large increments. For example, a reference plane-point may be adjusted by at least 1 μm, such as at least 2 μm, such as at least 5 μm, such as at least 10 μm, such as at least 25 μm, such as at least 50 μm, such as at least 100 μm, such as at least 250 μm, such as at least 500 μm, or such as at least 1 mm. Additionally, or in the alternative, a reference plane-point may be adjusted by less than 1 mm, such as less than 500 μm, such as less than 250 μm, such as less than 100 μm, such as less than 50 μm, such as less than 25 μm, such as less than 10 μm, such as less than 5 μm, or such as less than 2 μm.

In some embodiments, an adjustment to the reference plane may provide improved accuracy and precision of additive manufacturing operations so as to allow for objects to be additively manufactured with dimensional tolerances of +/− 50 μm or less, such as +/− 30 μm or less, such as +/− 25 μm or less, such as +/− 10 μm or less, or such as +/− 5 μm or less.

Exemplary embodiments of the present disclosure will now be described in further detail. FIG. 1 schematically depicts an exemplary additive manufacturing system 100. The additive manufacturing system 100 may include one or more additive manufacturing machines 102. The one or more additive manufacturing machines 102 may include a control system 104. The control system may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system.

As shown, an additive manufacturing machine 102 may include build module 110 that includes a build chamber 112 within which an object 114 may be additively manufactured in a layer-by-layer manner. In some embodiments, an additive manufacturing machine 102 may include a powder module 116 and/or an overflow module 118. The build module 110, the powder module 116, and/or the overflow module 118 may be provided in the form of modular containers configured to be installed into and removed from the additive manufacturing machine such as in an assembly-line process. Additionally, or in the alternative, the build module 110, the powder module 116, and/or the overflow module 118 may define a fixed portion of the additive manufacturing machine 102.

The powder module 116 contains a supply of powder material 120 housed within a supply chamber 122. The powder module 116 includes a powder piston 124 that elevates a powder floor 126 during operation of the additive manufacturing machine 102. As the powder floor 126 elevates, a portion of the powder material 120 is forced out of the powder module 116. A recoater 128 such as a blade or roller sequentially distributes thin layers of powder material 120 across the build module 110. A build platform 130 supports the sequential layers of powder material 120 distributed across the build module 110.

The additive manufacturing machine includes an energy beam system 132 configured to generate an energy beam 134 such as a laser or an electron beam, and to direct the energy beam 134 onto the surface of a powder bed 136 defined by the sequential layers of powder material 120, thereby selectively melting or fusing the sequential layers of powder material 120 to form the object 114. Typically with a DMLM, EBM, or SLM system, the powder material 120 is fully melted, with respective layers being melted or re-melted with respective passes of the energy beam 134. Conversely, with DMLS or SLS systems, layers of powder material 120 are sintered, fusing particles of powder material 120 to one another generally without reaching the melting point of the powder material 120. The energy beam system 132 may include componentry integrated as part of the additive manufacturing machine 102 and/or componentry that is provided separately from the additive manufacturing machine 102.

The energy beam system 132 includes an irradiation device 138 configured to generate an energy beam and to direct the energy beam upon a build plane. To irradiate a layer of powder having been distributed across the build module 110, the irradiation device directs the path of the energy beam 134 across the surface of the powder bed 136 so as to melt or fuse only the portions of the powder material 120 that are to become part of the object 114. The first layer or series of layers of powder material 120 are typically melted or fused to the build platform 130, and then sequential layers of powder material 120 are melted or fused to one another to additively manufacture the object 114.

The energy beam system 132 is situated in a fixed position relative to a reference plane 141 coinciding with the expected location of the build plane 142. The operation of the energy beam system 132 may be calibrated to fixed reference position 143 that may be used to determine a position of the energy beam system 132 relative to various locations of the reference plane 141. As sequential layers of powder material 120 are melted or fused to one another, a build piston 140 gradually lowers the build platform 130 so as to make room for the recoater 128 to distribute sequential layers of powder material 120. The as the build piston gradually lowers 140 and sequential layers of powdered material 120 are applied across the build module 110, the next sequential layer of power material 120 defines the surface of the powder bed 136 coinciding with the build plane 142. Sequential layers of powder material 120 may be selectively melted or fused to the object 114 until a completed object 114 has been additively manufactured.

In some embodiments, an additive manufacturing machine may utilize an overflow module 118 to capture excess powder material in an overflow chamber 144. The overflow module 118 may include an overflow piston 146 that gradually lowers to make room within the overflow chamber 144 for additional excess powder material 120.

It will be appreciated that in some embodiments an additive manufacturing machine may not utilize a powder module 116 and/or an overflow module 118, and that other systems may be provided for handling powder material, including different powder supply systems and/or excess powder recapture systems. However, the subject matter of the present disclosure may be practiced with any suitable additive manufacturing machine without departing from the scope hereof.

Still referring to FIG. 1, in accordance with the present disclosure, an additive manufacturing machine 102 may include a position measurement system 150. The position measurement system 150 is configured to project a measurement beam 152 upon the build plane 142 and to detect one or more properties of the measurement beam 152 upon having been reflected from the build plane 142. The one or more properties of the reflected measurement beam 152 may be used to determine a distance between the energy beam system 132 and the build plane 142. The position measurement system 150 may be an imaging system configured to project an electromagnetic beam such as an infrared beam from a laser diode. The position measurement system 150 may determine the spatial position of one or more points of the build plane 142 relative to one or more reference positions 143 for the energy beam system 132 and/or the position measurement system 150. The spatial position of the one or more points of the build plane 142 may be determined on the basis of any non-contact distance measurement technology including, for example, laser triangulation, interferometry, confocal displacement, structured light, modulated light, and/or time of flight, as well as combinations of these. Additionally, or in the alternative, any other suitable position sensing technology may be used, including ultrasound, magnetic displacement, and/or capacitive displacement technology.

The position measurement system 150 may project a measurement beam 152 in the form of a point, and/or the position measurement system 150 may project a linear or two-dimensional field of view 154. With a measurement beam 152 projected in the form of a point, the position measurement system 150 may determine a position of a static location of the build plane 142, and/or the measurement beam 152 may be scanned across at least a portion of the build plane 142 so as to determine a position with respect to a plurality of locations across the build plane 142. With the measurement beam 152 projected across a linear and/or three dimensional field of view, the position measurement system 150 may determine a position of a plurality of location across the build plane 142. The field of view 154 may remain static and/or the field of view may be scanned across at least a portion of the build plane 142. For example, a measurement beam 152 projected as a linear field of view 154 may be scanned across the build plane 142 to define a two-dimensional field of view 154.

The position measurement system 150 may include componentry integrated as part of the additive manufacturing machine 102 and/or componentry that is provided separately from the additive manufacturing machine 102. For example, the position measurement system 150 may include componentry integrated as part of the energy beam system 132. Additionally, or in the alternative, the position measurement system 150 may include separate componentry, such as in the form of an assembly, that can be installed as part of the energy beam system 132 and/or as part of the additive manufacturing machine 102.

Figure 2:
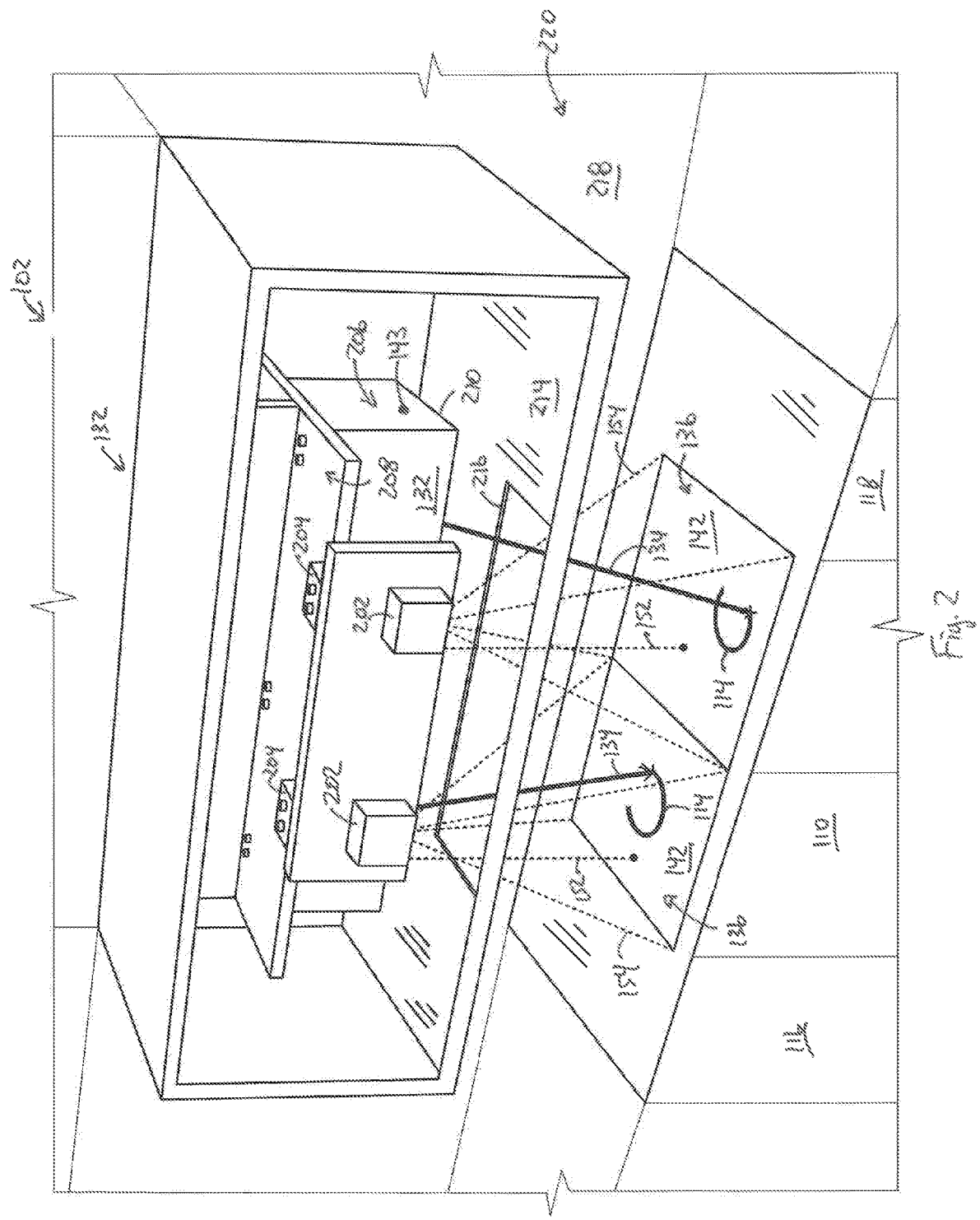
FIG. 2 schematically depicts a perspective view of an exemplary additive manufacturing machine.

By way of example, FIG. 2 shows an exemplary position measurement system 150 that includes a position measurement assembly 200 attached to an energy beam system 132. The position measurement assembly 200 may include one or more position sensors 202. As shown, two position sensors 202 are provided. However, it will be appreciated that a position measurement assembly 200 may include any number of position sensors 202. The energy beam system 132 may be configured to generate one or more energy beams 134. For example, as shown, the energy beam system 132 may generate two energy beams 134 from one, two, or more energy beam sources (see, e.g., FIG. 7). In some embodiments, the number of position sensors 202 may correspond to the number of energy beams 134 generated by the energy beam system 132 and/or the number of energy beam generating sources.

The position measurement assembly 200 may include various componentry for installing or attaching the one or more position sensors 202 in a fixed position. For example, the one or more position sensors 202 and other componentry may be attached to the energy beam system 132 in a suitable manner. As shown, the position measurement assembly 200 may include one or more mounting brackets 204 configured to attach the one or more position sensors 202 to the energy beam system 132. In some embodiments, an energy beam system 132 may include an energy beam generating assembly 206 mounted to an energy beam rail 208. For example, an energy beam housing 210 may be mounted to the energy beam rail 208, and the one or more energy beam sources may be contained within the energy beam housing 210. By mounting the one or more position sensors 202 to the energy beam rail 208, such as using the one or more mounting brackets 204, the one or more position sensors 202 are given a fixed position relative to the one or more energy beam sources 210, which facilitates measurement accuracy. For example, any movement or vibration of the additive manufacturing machine generally would be either absorbed by the energy beam rail 208 or would affect the of the energy beam housing and position sensors relatively equivalently. However, the one or more position sensors 202 may be mounted in any location that allows the respective one or more measurement beams 152 to be projected upon the build plane 142. Vibration damping materials and componentry may be utilized in the event such movement or vibration are of concern.

The energy beam system 132 and/or the position measurement system 150 may be contained within an instrument cladding 212 prevents against a stray energy beam from exiting the additive manufacturing machine while also providing some protection to the energy beam system 132 and/or the position measurement system 150 from loose powder 120 that may be disrupted from the powder bed 136. The instrument cladding 212 includes a bottom surface 214 with one or more ports 216 through which the one or more energy beams 134 and the one or more measurement beams 152 are projected onto the powder bed 136 and/or the build plane 142. The instrument housing may be surrounded by an outer housing 218 defining a build chamber 220 within which the additive manufacturing process takes place.

Figure 3:
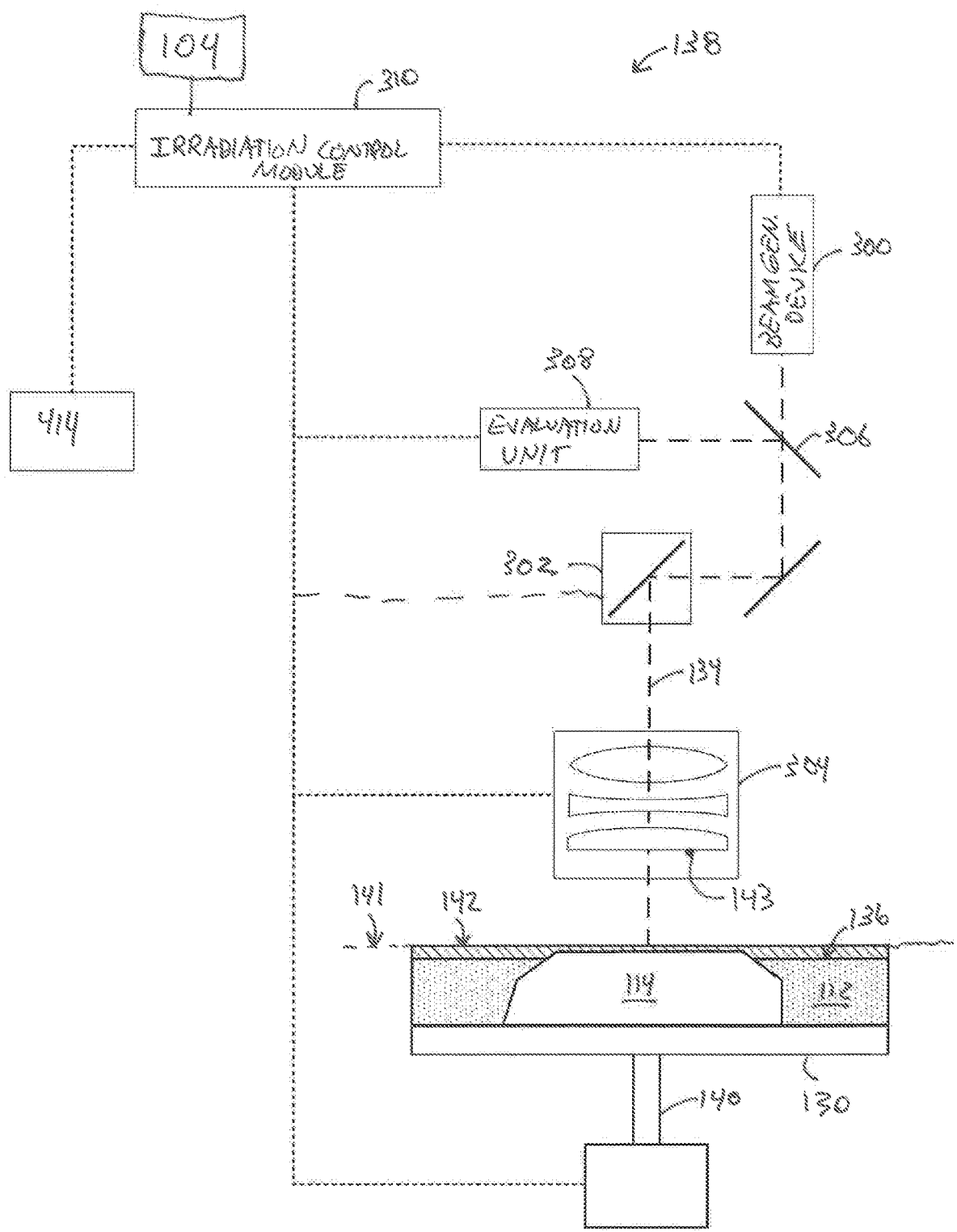
FIG. 3 schematically depicts an exemplary irradiation unit.

Now turning to FIG. 3, an exemplary irradiation device 138 will be described. As shown, an irradiation device 138 may include a beam generating unit 300, a scanner 302, and an optical assembly 304. The beam generating unit 300 is configured to generate an energy beam 152, such as a laser beam or an electron beam. The scanner 302 is configured to control the orientation of the energy beam 152 so as to direct the path of the energy beam 152 across the powder bed 136. The optical assembly 304 includes one or more lenses configured to focus the energy beam 152.

In some embodiments, an irradiation device 138 may include a beam splitter 306 configured to direct at least a portion of the energy beam 134 to an evaluation unit 308 configured to evaluate one or more properties of the energy beam 134. The evaluation unit 308 may be configured to monitor one or more properties of the energy beam 134, such as energy density.

Operation of the irradiation device may be performed according to control commands from an irradiation control module 310. The control commands may be transmitted to one or more controllable components associated with the irradiation device.

Now turning to FIGS. 4A and 4B, exemplary position measurement systems 150 will be described. A position measurement system 150 may include any non-contact measurement device. A position measurement system 150 may include a laser triangulation device, an interferometer, a confocal light sensor, a structured light device, a modulated light device, as well as combinations of these. Alternatively, a position measurement system 150 may utilize an ultrasonic distance sensor, a magnetic displacement sensor, and/or a capacitive displacement sensor.

Figure 4A:
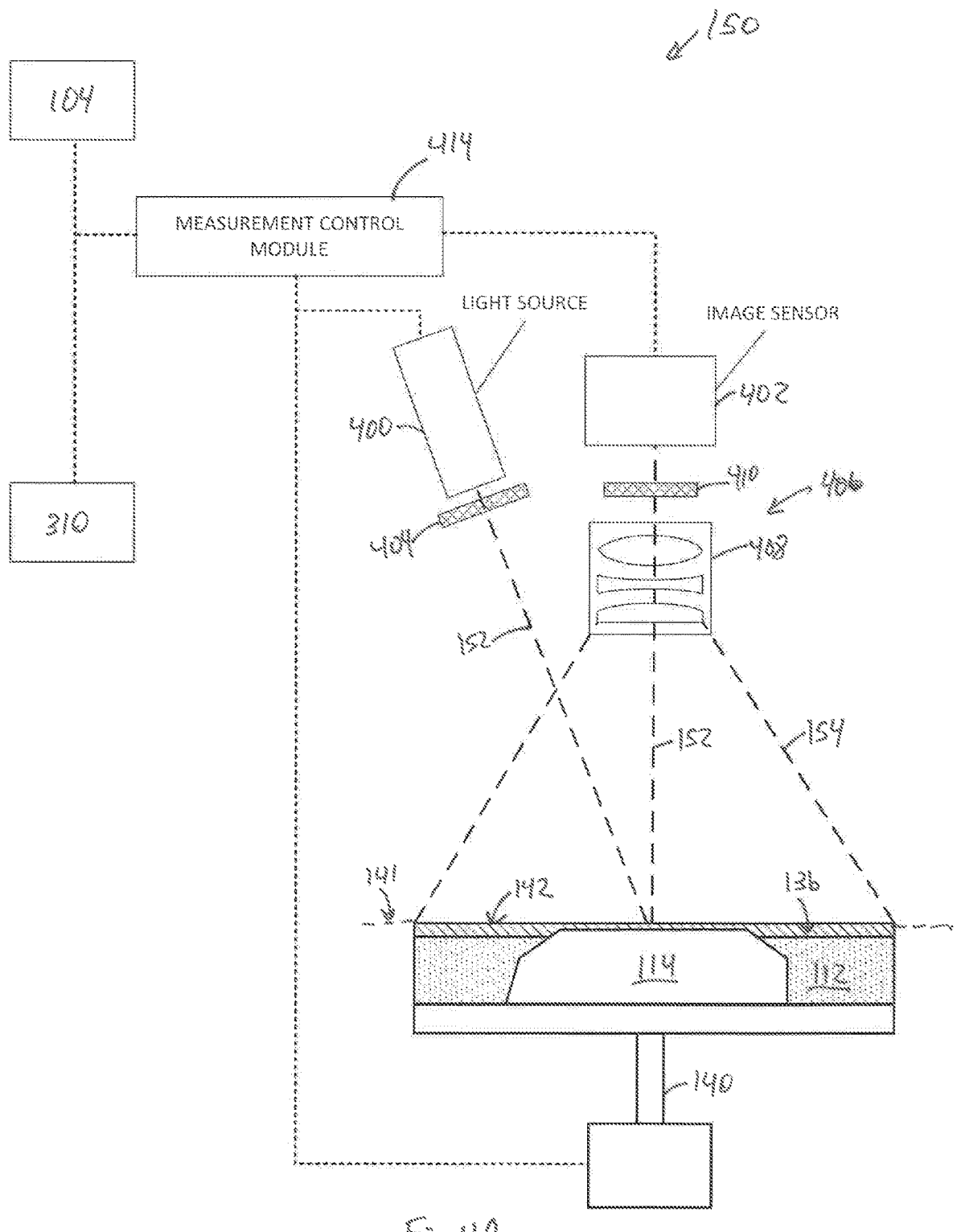
FIGS. 4A and 4B schematically depict exemplary position measurement systems.
Figure 4B:
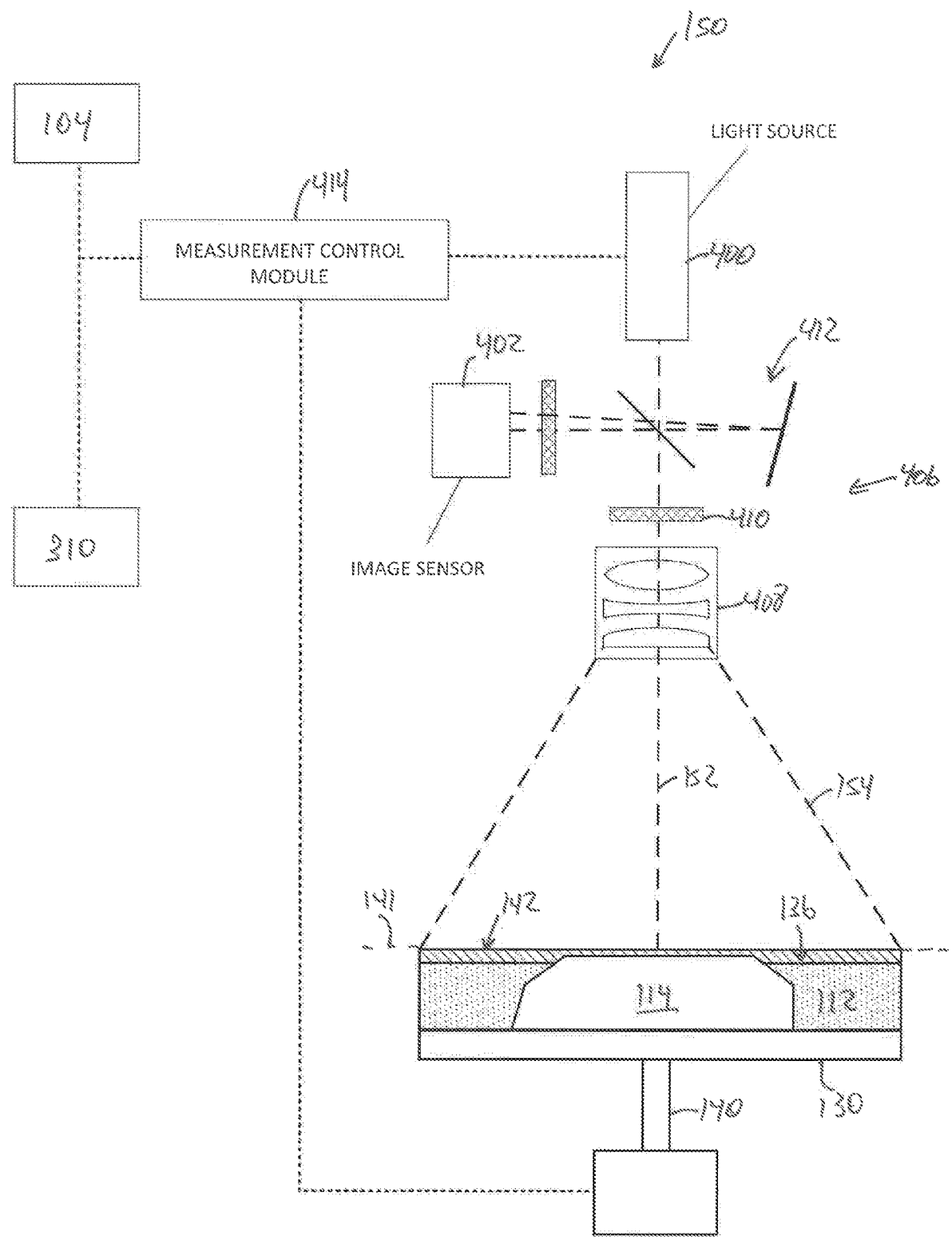

As shown in FIGS. 4A and 4B, an exemplary position measurement system 150 includes a light source 400 such as a laser diode, and an image sensor 402, such as a charge-coupled device. The light source 400 may emit a measurement beam 152 that impinges on the surface of the powder bed 136 in a field of view 154 of the image sensor 402. The field or view 154 may include all or a portion of the build plane 142. The measurement beam 152 may follow an optical path that passes through one or more projection optical elements 404 prior to impinging upon the powder bed 136. The one or more projection optical elements 404 may include one or more lenses, filters, diffusers, apertures or other optical element, as well as combinations of these. The projection optical element 404 may be configured to provide a collimated and/or focused measurement beam. The optical element may additionally, or alternatively filter the measurement beam 152 to provide a particular wavelength range.

In some embodiments, the projection optical element 404 may be configured to project the measurement beam 152 onto the surface of the powder bed 136 in the form of a structured light pattern and/or a modulated light pattern. An exemplary pattern may include an array of dots or any other suitable pattern. The structured and/or modulated light pattern may be utilized to determine a three-dimensional topography of the powder bed 136.

After impinging upon the build plane 142 (e.g., the powder bed 136), the measurement beam reflected from the build plane 142 follows an optical path to the image sensor 402. The optical path from the build plane 142 to the image sensor 402 may include one or more measurement optical elements 406. The one or more measurement optical elements 406 may include one or more lenses, filters, diffusers, apertures or other optical element, as well as combinations of these. For example, as shown, the one or more measurement optical elements 406 may include an imaging lens assembly 408 and/or a filter element 410. The imaging lens assembly may include one or more lenses or other optical elements configured to focus the measurement beam incident upon the image sensor 402. The filter element 410 may include one or more filters, diffusers, and/or apertures configured to conform the measurement beam 152 incident upon the image sensor 402 to a certain wavelength or range of wavelengths. As shown in FIG. 4B, in some embodiments, the position measurement system 150 may include an interferometer 412 or a series of optical elements configured to perform interferometry. By way of example, the interferometer may be configured as a Michelson interferometer, a Mach-Zehnder interferometer, an Fabry-Pérot Interferometer, a Sagnac Interferometer, a common-path Interferometer, and so forth.

Operation of the position measurement system 150 may be performed according to control commands from a measurement control module 414. The control commands may be transmitted to one or more controllable components associated with the position measurement system 150.

Now turning to FIGS. 5A and 5B, exemplary position measurements will be described. As shown in FIGS. 5A and 5B, an exemplary position measurement system 150 may determine a position of a build plane 142 relative to a reference plane 141. A position of the build plane 142 may be determined at any time or series of times prior to, during, or after operation of an additive manufacturing machine 100. In some embodiments, a position of the build plane 142 may be determined prior to commencing operation of the additive manufacturing machine 100, such as prior to commencing a build process to build an object 114. As shown in FIGS. 5A and 5B, the position of the build plane 142 may be determined prior to distributing powder material 122 across the build module 110. In that instance, the build plane 142 may correspond to the top surface of the build plate 130. Additionally, or in the alternative, the position of the build plane 142 may be determined after to distributing powder material 122 across the build module 110. In that instance, the build plane 142 may correspond to the surface of the powder bed 136.

In some embodiments, the position of the build plane 142 may be determined before, during, and/or after sequential layers of powder material 122 have been distributed across the build module 110 and/or before, during, and/or after the sequential layers of powder have been selectively irradiated by an energy beam to form the respective layer of the object 114. These measurements may be obtained intermittently and/or after each sequential layer, for example, to confirm proper alignment of the build plane 142 with the reference plane 141 at respective points in time during operation of the additive manufacturing machine 100.

The position of the build plane 142 may be determined using a distance measurement $d_m$, representing a distance between a position on the build plane 142 and a reference position 143 for the energy beam system 132 and/or the position measurement system 150. The distance measurement $d_m$ may be compared to a reference value $d_r$, representing a distance between a corresponding position on a reference plane 141 and the reference position 143. An error value "e" may be determined by comparing the distance measurement $d_m$ to the reference value $d_r$. For example, the error value e may be determined according to the relationship: $e = d_m - d_r$. An error value of zero may indicate congruence between the measured position on the build plane 142 and the corresponding position on the reference plan 141. An error value of greater than zero or less than zero may indicate divergence between the measured position on the build plane 142 the corresponding position on the reference plane 141.

For example, as shown in FIG. 5A, comparison of a distance measurement $d_m$ to a reference value $d_r$ yields an error value e indicating that the measured position on the build plane 142 is situated below the corresponding position on the reference plane 141. An adjustment may be applied with respect to all or a portion of the reference plane 141 to compensate for the error value e. In some embodiments, the reference plane 141 may be adjusted based at least in part on the error value e., for example, by shifting vertically the reference plane 141 in an amount corresponding to the error value e. The adjustment to the reference plane 141 may align the reference plane 141 with the build plane 142.

In some embodiments, the build plane 142 may be presumed to be sufficiently flat or otherwise known that a distance measurement $d_m$ for a single build plane-point 142 may provide sufficient information for determining an adjustment to the reference plane 141. However, the present disclosure is not limited to obtaining a distance measurement $d_m$ for only single build plane-point 142. Rather, in some embodiments a distance measurement $d_m$ may be obtained for a plurality of points on a build plane 142.

For example, as shown in FIG. 5B, a plurality of distance measurements may be used to determine a degree of levelness and/or a degree of parallelism between a reference plane 141 and a build plane 142. As shown in FIG. 5B, a comparison of a first distance measurement $d_{m1}$ to a first reference value $d_{r1}$ yields a first error value $e_1$, and a comparison of a second distance measurement $d_{m2}$ to a second reference value $d_{r2}$ yields a second error value $e_2$. A comparison of the first error value $e_1$ and the second error value $e_2$ may indicate a divergence in the levelness and/or the parallelism of the build plane 142 relative to the reference plane 141. For example, as shown in FIG. 5B, the build platform 130 is tilted, positioning a portion of the build platform 130 above the reference plane 141. A slope may be determined by comparing the first error value to the second error value. An adjustment may be applied with respect to all or a portion of the reference plane 141 to compensate for the first error value $e_1$ and the second error value $e_2$, for example, by tilting and/or shifting vertically the reference plane 141 in an amount corresponding to the error value e. The adjustment to the reference plane 141 may align the reference plane 141 with the build plane 142.

Now referring to FIG. 6, in some embodiments, a build plane 142 may be determined using a plurality of distance measurements. The plurality of distance measurements may be used to compare an orientation of the build plane 142 to an orientation of the reference plane 141. The orientation of the build plane 142 may include levelness, parallelism, vertical shift, horizontal shift, twist, and so forth. In some embodiments, the build plane 142 may be determined using distance measurements $d_m$ corresponding to three different points on the build plane 142. The build plane 142 may be compared to the reference plane 141 by comparing the respective distance measurements $d_m$ to corresponding points on the reference plane 141. For example, as shown in FIG. 6, a first build plane-point $p_{b1}$ may be compared to a first reference plane-point $p_{r1}$ to obtain a first error value $e_1$, a second build plane-point $p_{b2}$ may be compared to a second reference plane-point pre to obtain a second error value $e_2$, and a third build plane-point $p_{b3}$ may be compared to a third reference plane-point $p_{r3}$ to obtain a third error value $e_3$. A comparison of the build plane 142 to the reference plane 141 may indicate a divergence of the build plane 142 relative to the reference plane 141. For example, as shown in FIG. 6, a divergent between the build plane 142 and the reference plane 141 may include elements of levelness, parallelism, shift, twist.

The position measurement system 150 may be utilized to compare a build plane 142 to a reference plane 141 for a variety of different purposes. By way of example, FIGS. 5A and 5B, and FIG. 6 show examples of determining orientation of the build plane 142 with respect to levelness, parallelism, vertical shift, horizontal shift, or twist, as well as combinations of these. Further examples will now be described with reference to FIGS. 7A-7D.

Figure 7A:
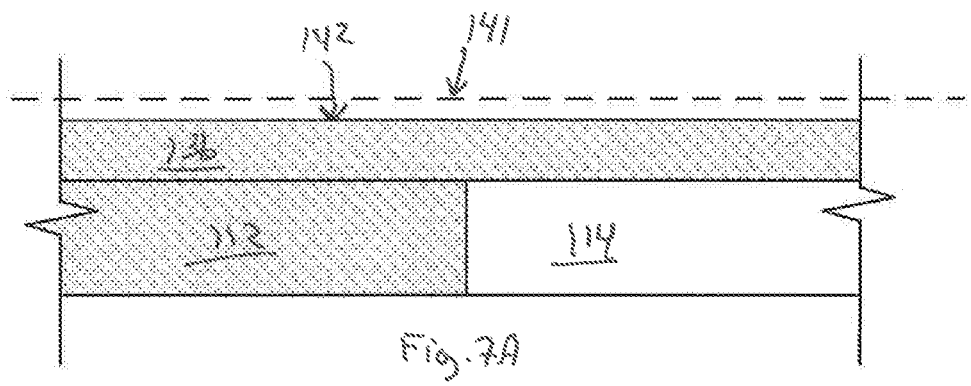
FIGS. 7A-7D schematically depict exemplary features of a build plane that may be associated with a divergence from a reference plane.

As shown FIGS. 7A-7D, various features of a build plane 142 (e.g., a powder bed 136 and/or a build platform 130) may be associated with a divergence from a reference plane 141. As shown in FIG. 7A, a build plane 142 may be situated at an elevation that differs from an elevation of a reference plane 141. This may occur, for example, when the volume of powder material 120 distributed across the build module 110 differs from an expected volume (greater than or less than expected), resulting in a powder bed defining a build plane 142 being positioned above or below the reference plane 141. Additionally, or in the alternative, movement of the build platform may result in a difference between the build plane 142 the reference plane 141. Such movement may include incremental movements that are greater or less than expected, or unintended movements, such as due to slippage, machine vibrations, and so forth.

As another example, a powder bed may settle over time, such as during interruptions in machine operations, resulting in a build plane 142 being that differs from a reference plane 141. For example, with larger additive manufacturing machines and/or larger builds, machine operations may be interrupted temporarily to replenish a powder supply and/or exchange powder modules, which may introduce a potential divergence between the build plane 142 and the reference plane 141, associated with powder settling, vibration, or unintended movements of the additive manufacturing machine componentry.

Figure 7B:
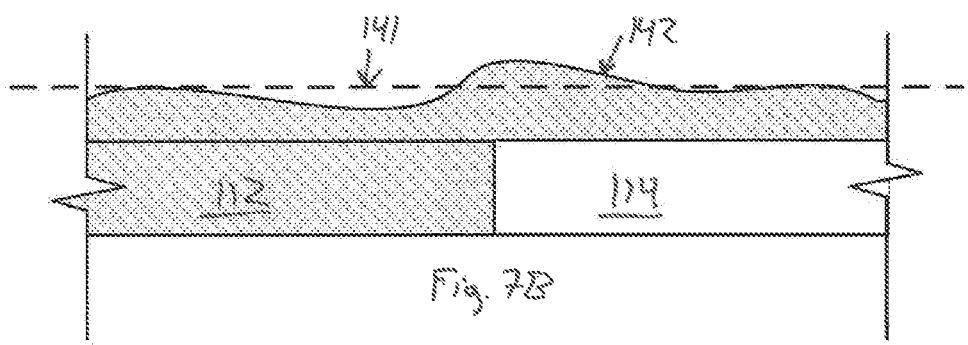
Figure 7C:
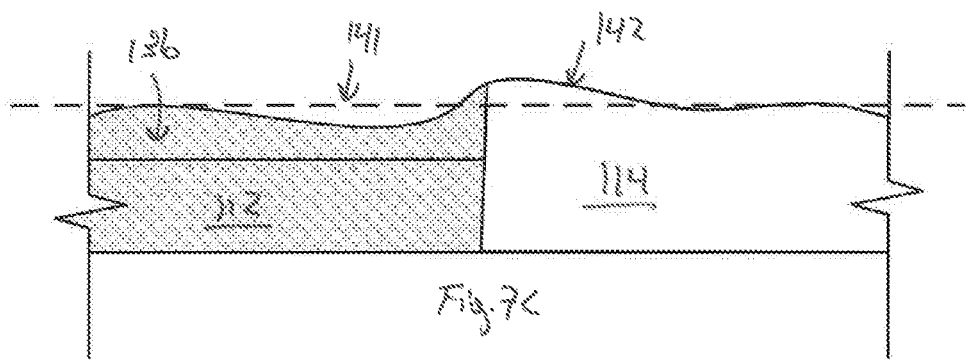
Figure 7D:
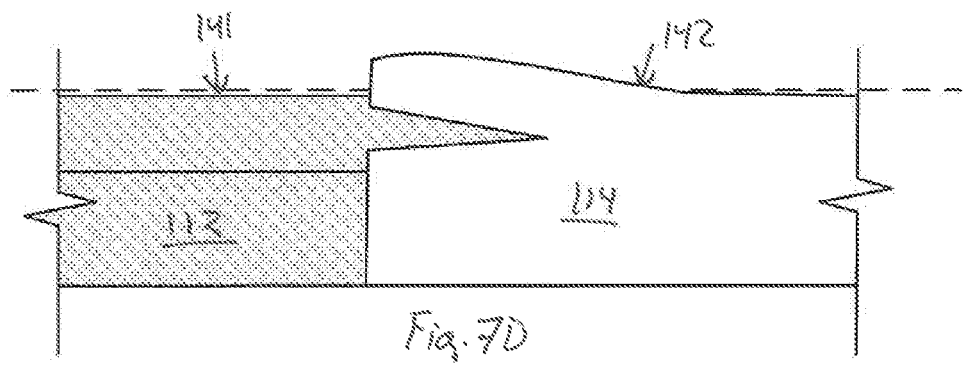

As shown in FIGS. 7B-7D, in some embodiments, a position measurement system 150 may be utilized to determine a local difference between a build plane 142 and a reference plane 141, such as due to uneven powder distribution (FIG. 7B), thermal expansion of an object 114 (FIG. 7C), and/or partial separation of an object 114 (FIG. 7D). A position measurement system 150 may apply adjustments compensate for these and other local differences between a build plane 142 and a reference plane 141.

As shown in FIG. 8, in some embodiments, a depth map 800 may be generated for a surface of a build plane 142 using position measurements from a position measurement system 150. A depth map 800 may be generated using triangulation techniques and/or structured or modulated light techniques. A depth may include an array of discrete points on a build plane 142, corresponding, for example, to respective pixels of an image sensor 402. The depth map may reveal differences between a build plane 142 and a reference plane 141 that may exist for any reason, including those described herein with reference to FIGS. 5A and 5B, FIG. 6, and FIGS. 7A-7D.

Regardless of the measurement methodology used to determine a position of a build plane 142, and regardless of how many discrete points on a build plane 142 are determined, an additive manufacturing system 100 and/or additive manufacturing machine 102 may utilize information about the build plane 142 determined using the position measurement system 150 for a variety of different purposes. In some embodiments, a reference plane 141 may be adjusted based at least in part on information about a build plane 142 determined by the position measurement system 150. Additionally, or in the alternative, one or more operations of the additive manufacturing system 100 and/or additive manufacturing machine may be adjusted based at least in part on information about a build plane 142 by the position measurement system 150. The information about the build plane 142 used for making adjustments may include discrete position measurements and/or data determined using measurements, such as data obtained over time, as well as data subjected to various modeling and/or statistical analysis algorithms.

Now turning to FIGS. 9A-9D, an exemplary methods will be described. An exemplary method 900 may include determining a position of a build plane 142. As shown in FIG. 9A, the exemplary method 900 may include, at block 902, projecting an energy beam incident upon a build plane 142; at block 904, detecting one or more properties of the energy beam upon having been reflected from the build plane 142; and at block 906, using the one or more properties of the detected energy beam to determine the position of the build plane 142. In an exemplary embodiment, a position of the build plane 142 may be determined at least in part using laser triangulation. In another exemplary embodiment, a position of the build plane 142 may be determined at least in part using structured light and/or modulated light.

An exemplary method 910 may include aligning a reference plane 141 to a build plane 142, and/or calibrating a position of a reference plane 141. As shown in FIG. 9B, an exemplary method 910 may include, at block 912, determining a position of a build plane 142; at block 914, comparing the position of the build plane 142 to a corresponding position of a reference plane 141; and at block 916, adjusting a position of the reference plane 141 based at least in part on the comparison of the position of the build plane 142 to the corresponding position of the reference plane 141.

An exemplary method 920 may include operating an additive manufacturing machine and/or additively manufacturing an object. As shown in FIG. 9C, an exemplary method 920 may include, at block 922, determining a position of a build plane 142; and at block 924, transmitting a control command to one or more controllable components of an additive manufacturing machine based at least in part on the determined position of the build plane 142.

In some embodiments, an exemplary method 930 may include, at block 932, additively manufacturing at least a portion of an object; at block 934, interrupting one or more operations of the additive manufacturing machine; at block 936, calibrating a reference plane 141 based at least in part on a position of a build plane 142 determined using a position measurement system 150; and at block 938, resuming the one or more operations of the additive manufacturing machine. In some embodiments, the one or more operations of the additive manufacturing machine may be interrupted to replenish a powder supply and/or exchange powder modules.

Figure 10:
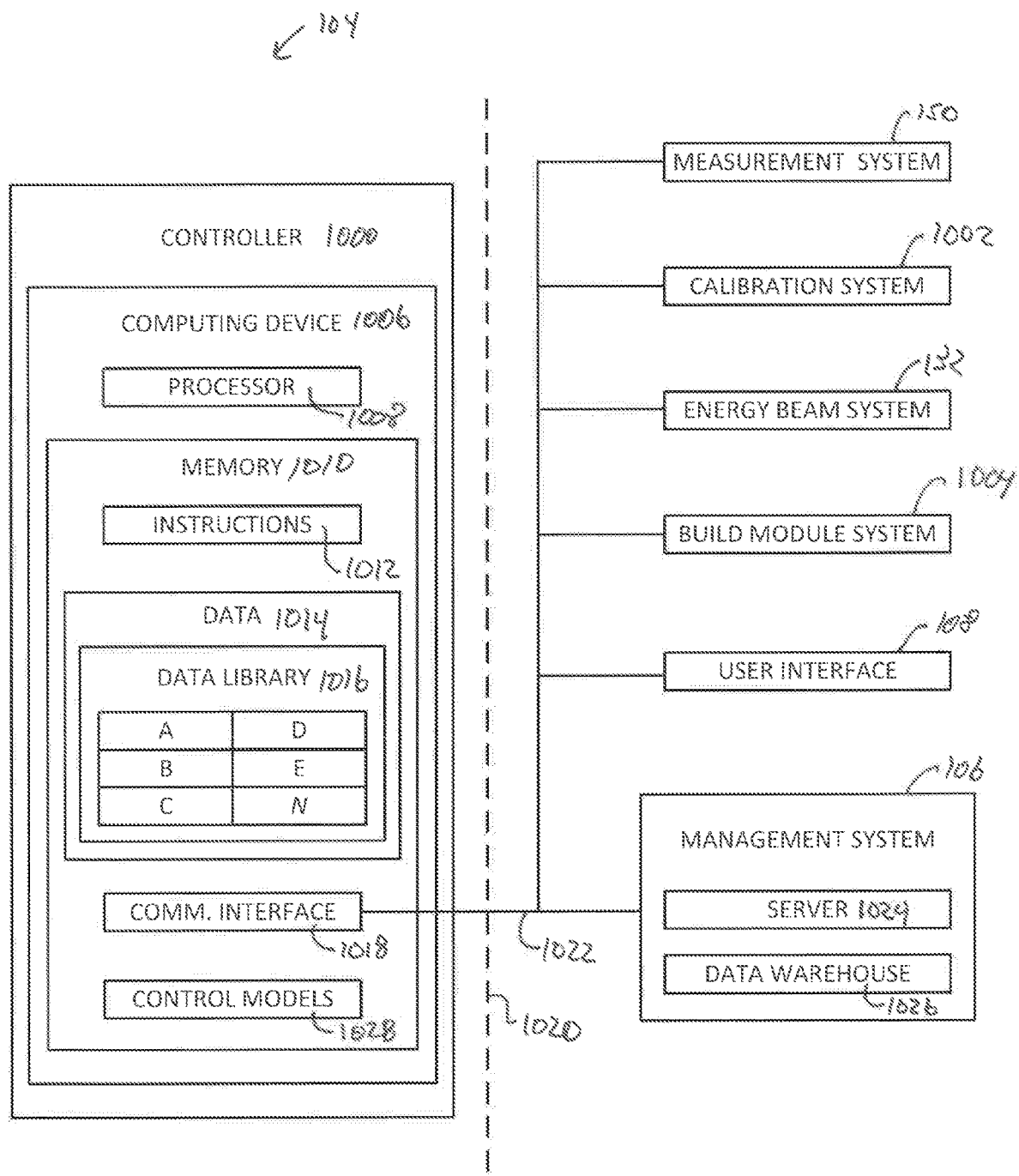
FIG. 10 schematically depicts an exemplary control system.

Now turning to FIG. 10, and exemplary control system 104 will be described. An exemplary control system 104 includes a controller 1000 communicatively coupled with an additive manufacturing machine 102. For example, the controller may be communicatively coupled with a measurement system 150 and/or an energy beam system 132. In some embodiments, the controller 1000 may be communicatively coupled with a calibration system 1002 configured to perform calibration procedures. Additionally, or in the alternative, the controller 1000 may be communicatively coupled with a build module system 1004 configured to perform build module operations, including functionalities of a build module 110, powder module 116, and/or overflow module 118. Such build module operations may additionally or alternatively include exchanging powder modules and/or overflow modules. The controller 1000 may also be communicatively coupled with a user interface 108 and/or a management system 106.

The controller 1000 may include one or more computing devices 1006, which may be located locally or remotely relative to the additive manufacturing machine 102. The one or more computing devices 1006 may include one or more processors 1008 and one or more memory devices 1010. The one or more processors 1008 may include any suitable processing device, such as a microprocessor, microcontroller, integrated circuit, logic device, and/or other suitable processing device. The one or more memory devices 1010 may include one or more computer-readable media, including but not limited to non-transitory computer-readable media, RAM, ROM, hard drives, flash drives, and/or other memory devices.

The one or more memory devices 1010 may store information accessible by the one or more processors 1008, including machine-executable instructions 1012 that can be executed by the one or more processors 1008. The instructions 1012 may include any set of instructions which when executed by the one or more processors 1008 cause the one or more processors 1008 to perform operations. In some embodiments, the instructions 1012 may be configured to cause the one or more processors 1008 to perform operations for which the controller 1000 and/or the one or more computing devices 1006 are configured.

The memory devices 1010 may store data 1014 accessible by the one or more processors 1008. The data 1014 can include current or real-time data, past data, or a combination thereof. The data 1014 may be stored in a data library 1016. As examples, the data 1014 may include data associated with or generated by additive manufacturing system 100, including data 1014 associated with or generated by a controller 1000, the additive manufacturing machine 102, the user interface 108, the management system 106, and/or a computing device 1006. The data 1014 may also include other data sets, parameters, outputs, information, associated with an additive manufacturing system 100, such as those associated with the additive manufacturing machine 102, the user interface 108, and/or the management system 106.

The one or more computing devices 1006 may also include a communication interface 1018, which may be used for communications with a communication network 1020 via wired or wireless communication lines 1022. The communication interface 1018 may include any suitable components for interfacing with one or more network(s), including for example, transmitters, receivers, ports, controllers, antennas, and/or other suitable components. The communication interface 1018 may allow the computing device 1006 to communicate with the additive manufacturing machine 102. The communication network 1020 may include, for example, a local area network (LAN), a wide area network (WAN), SATCOM network, VHF network, a HF network, a Wi-Fi network, a WiMAX network, a gatelink network, and/or any other suitable communication network 1020 for transmitting messages to and/or from the controller 1000 across the communication lines 1022. The communication lines 1022 of communication network 1020 may include a data bus or a combination of wired and/or wireless communication links.

The communication interface 1018 may additionally or alternatively allow the computing device 1006 to communicate with a user interface 108 and/or a management system 106. The management system 106 may include a server 1024 and/or a data warehouse 1026. As an example, at least a portion of the data 1014 may be stored in the data warehouse 1026, and the server 1024 may be configured to transmit data 1014 from the data warehouse 1026 to the computing device 1006, and/or to receive data 1014 from the computing device 1006 and to store the received data 1014 in the data warehouse 1026 for further purposes. The server 1024 and/or the data warehouse 1026 may be implemented as part of a control system 104.

The controller 1000 may include one or more control models 1028, which may utilize the data 1014, including the data library 1016, and/or other data sets, parameters, outputs, information, associated with the additive manufacturing system 100, such as those associated with the additive manufacturing machine 102, the user interface 108, and/or the management system 106. The one or more control models 1028 may additionally or alternatively utilize data from the data warehouse 1026, which may be transmitted to the controller 1000 from the server 1024.

Referring again to FIG. 1, in some embodiments, a control system 104 may be configured to perform a calibration of the reference plane 141. The calibration may be utilized by the additive manufacturing system to generate control commands to the additive manufacturing machine. Exemplary control commands may include directing the position and/or energy density of an energy beam, including imparting a desired spot size incident upon the build plane 142 and/or imparting a desired energy input to a respective portion of the build plane 142. Exemplary control commands may additionally or alternatively include control commands configured to operate motors used to operate the powder module, build module, and/or overflow module. The control commands may be used to control a motor that operates the piston that raises or lowers the platform of the respective module. For example, a build module 110 may include a build module motor 156, and the control system 104 may transmit a control command to the build module motor 156 based at least in part on a position of the build plane 142 determined by the position measurement system 150. Additionally, or in the alternative, a powder module 116 may include a powder module motor 158, and the control system 104 may transmit a control command to the powder module motor 158 based at least in part on a position of the build plane 142 determined by the position measurement system 150. The control commands to the build module motor 156 and/or the powder module motor 158 may be provided to align the build plane 142 with the reference plane 141. In some embodiments, an overflow module 116 may include an overflow module motor 160, and the control system 104 may transmit a control command to the overflow module motor 158 based at least in part on a position of the build plane 142 determined by the position measurement system 150, for example, to accommodate a volume of overflow powder material 120 being recaptured in the overflow chamber 144.

Referring again to FIG. 3, exemplary control commands may be configured to impart a desired energy input to a respective portion of the build plane 142, based at least in part on a position of the build plane 142 determined by the position measurement system 150. For example, a control command may be transmitted to a beam generating device 300, such as to impart a desired energy input to a respective portion of the build plane 142. Additionally, or in the alternative, a control command may be transmitted to an optical assembly 304, such as to impart a desired spot size incident upon the build plane 142 based at least in part on a position of the build plane 142 determined by the position measurement system 150. Still further additionally, or in the alternative, a control command may be transmitted to a scanner 302, such as to control movements of an energy beam (e.g., speed and/or contour path) upon based at least in part on a position of the build plane 142 determined by the position measurement system 150. In some embodiments, an evaluation unit 300 may provide feedback pertaining to one or more properties of the energy beam.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing system, comprising:
    an energy beam system comprising one or more energy beam sources; and
    a position measurement system comprising a position measurement assembly attached to the energy beam system, the position measurement assembly comprising one or more position sensors and one or more mounting brackets attaching the one or more position sensors to the energy beam system;
    wherein the energy beam system is situated in a fixed position relative to a reference plane, the reference plane coinciding with an expected position of a build plane based on a calibration; and
    wherein the position measurement system is configured to determine a position of the build plane relative to the reference plane and to adjust the reference plane based at least in part on the determined position of the build plane.

2. The additive manufacturing system of claim 1, wherein the energy beam system comprises:
    an energy beam generating assembly mounted to an energy beam rail; and
    wherein the one or more mounting brackets are attached to the energy beam rail, and the one or more position sensors are attached to the one or more mounting brackets.

3. The additive manufacturing system of claim 2, wherein the energy beam generating assembly comprises an energy beam housing, the one or more energy beam sources contained within the energy beam housing, the energy beam housing mounted to the energy beam rail.

4. The additive manufacturing system of claim 1, wherein the one or more position sensors comprises at least one of: a laser triangulation device, an interferometer, a confocal light sensor, a structured light device, and a modulated light device.

5. The additive manufacturing system of claim 1, wherein the one or more position sensors comprises a light source and an image sensor, the light source configured to emit a measurement beam that impinges upon the build plane in a field of view of the image sensor, the image sensor configured to detect at least a portion of the light source reflected by the build plane.

6. The additive manufacturing system of claim 5, wherein the one or more position sensors comprises a projection optical element configured to provide a collimated and/or focused measurement beam.

7. The additive manufacturing system of claim 5, wherein the one or more position sensors comprises a projection optical element configured to provide a measurement beam comprising a structured light pattern and/or a modulated light pattern.

8. The additive manufacturing system of claim 1, comprising:
    an instrument cladding, wherein at least a portion of the energy beam system is contained within the instrument cladding and/or at least a portion of the position measurement system is contained within the instrument cladding.

9. The additive manufacturing system of claim 8, wherein the instrument cladding comprises a bottom surface with one or more ports; and
    wherein the one or more energy beam sources are configured to project one or more energy beams through the one or more ports and onto the build plane, and/or wherein the one or more position sensors are configured to project one or more measurement beams through the one or more ports and onto the build plane.

10. The additive manufacturing system of claim 1, comprising:
    one or more build modules configured to be installed into and removed from the additive manufacturing system, respective ones of the one or more build modules comprising a build plate configured to support sequential layers of powder material defining a powder bed, the build plane corresponding to the top surface of the build plate and/or the powder bed supported by the build plate.

11. The additive manufacturing system of claim 1, comprising:
    a control system configured to cause the position measurement system to determine the position of the build plane.

12. The additive manufacturing system of claim 1, wherein the additive manufacturing system is configured to perform a method of aligning the reference plane to the build plane, the method comprising:
    determining, with the position measurement system, a position of the build plane relative to the reference plane for the energy beam system; and
    adjusting the reference plane based at least in part on the determined position of the build plane.

\* \* \* \* \*